United States Patent
Balsamo et al.

(10) Patent No.: US 10,401,703 B2
(45) Date of Patent: Sep. 3, 2019

(54) OPTICAL MODULATOR

(71) Applicant: Oclaro Technology Limited, Northamptonshire (GB)

(72) Inventors: Stefano Balsamo, Milan (IT); Giuseppe Cusmai, San Giuliano Milanese (IT); Marco Villa, Cabiate (IT); Nicola Rettani, Voghera (IT); Paolo Vergani, Vimercate (IT); Haydn Jones, Berkshire (GB)

(73) Assignee: Lumentum Technology UK Limited, Northamptonshire (GB)

( * ) Notice: Subject to any disclaimer, the term of this patent is extended or adjusted under 35 U.S.C. 154(b) by 320 days.

(21) Appl. No.: 14/437,764

(22) PCT Filed: Jul. 31, 2013

(86) PCT No.: PCT/GB2013/052051
§ 371 (c)(1),
(2) Date: Apr. 22, 2015

(87) PCT Pub. No.: WO2014/064416
PCT Pub. Date: May 1, 2014

(65) Prior Publication Data
US 2015/0293426 A1    Oct. 15, 2015

(30) Foreign Application Priority Data

Oct. 24, 2012 (GB) .................................. 1219116.9

(51) Int. Cl.
  *G02F 1/21* (2006.01)
  *G02B 27/28* (2006.01)
  (Continued)

(52) U.S. Cl.
  CPC ............. *G02F 1/21* (2013.01); *G02B 27/283* (2013.01); *H04B 10/5053* (2013.01);
  (Continued)

(58) Field of Classification Search
  CPC .......... G02B 27/283; G02F 1/21; G02F 1/225
  See application file for complete search history.

(56) References Cited

U.S. PATENT DOCUMENTS 5,751,455 A * 5/1998 Shibutani ........... H04B 10/5051
                                                                398/1
7,826,689 B2 * 11/2010 Sugiyama ............... G02F 1/035
                                                                385/2
(Continued)

FOREIGN PATENT DOCUMENTS

EP        2169851        3/2010
GB        2452505 A      3/2009
(Continued)

OTHER PUBLICATIONS

Cho, Pak S., et al., "Demonstration of high-spectral-efficiency 40-Gb/s optical communications system using 4 bits per symbol coding," Proc. of SPIE, Aug. 10, 2004, Bellingham, Washington, USA, vol. 5440, pp. 371-382, XP040185578.

(Continued)

*Primary Examiner* — Sung H Pak
*Assistant Examiner* — Hoang Q Tran
(74) *Attorney, Agent, or Firm* — Harrity & Harrity, LLP

(57) ABSTRACT

The invention relates to a folded Mach-Zehnder modulator. The modulator may comprise a beam splitter configured to split an input light beam into a plurality of light beams. The modulator may comprise a plurality of Mach-Zehnder devices configured to receive one or more of the plurality of light beams. The modulator may comprise a U-turn section configured to receive light beams from the Mach-Zehnder devices and to change the direction of the light beams by substantially 180 degrees. The modulator may comprise a polarization management section configured to combine (Continued)

light beams received from the U-turn section and to output a polarization multiplexed phase modulated light beam.

9 Claims, 5 Drawing Sheets

(51) Int. Cl.
*H04B 10/50* (2013.01)
*H04B 10/556* (2013.01)

(52) U.S. Cl.
CPC ... *H04B 10/5561* (2013.01); *G02F 2001/212* (2013.01); *G02F 2201/16* (2013.01)

(56) References Cited

U.S. PATENT DOCUMENTS

| | | |
|---|---|---|
| 2003/0223728 A1 | 12/2003 | Maeda et al. |
| 2004/0240765 A1 | 12/2004 | Wooten et al. |
| 2005/0213863 A1* | 9/2005 | Sugiyama ............. G02F 1/2255 385/2 |
| 2006/0056002 A1* | 3/2006 | Wooten ................ G02F 1/225 359/245 |
| 2007/0177882 A1 | 8/2007 | Akiyama |
| 2008/0056637 A1 | 3/2008 | Sugiyama |
| 2011/0217040 A1* | 9/2011 | Mori .................... H04J 14/06 398/53 |
| 2013/0011093 A1 | 1/2013 | Goh et al. |
| 2013/0170782 A1* | 7/2013 | Evans .................. G02F 1/225 385/3 |

FOREIGN PATENT DOCUMENTS

| | | |
|---|---|---|
| JP | 2004007058 | 1/2004 |
| JP | 2004361952 | 12/2004 |
| JP | 2005084090 | 3/2005 |
| JP | 2005181583 | 7/2005 |
| JP | 2010081287 | 4/2010 |
| JP | 2011034057 | 2/2011 |
| WO | WO 2009/103041 A1 | 8/2009 |
| WO | WO 2011/114753 A1 | 9/2011 |

OTHER PUBLICATIONS

Intellectual Property Office of the United Kingdom, Patents Act 1977: Search Report under Section 17(5), United Kingdom Patent Application No. GB1219116.9, Feb. 11, 2013, 4 Pages.

Mino, S., et al., "Coherent Optical Component Technologies for WDM Transmission Systems," Proc. of SPIE, Jan. 22, 2011, Bellingham, Washington, USA, vol. 7960, pp. 1-8, XP040555978.

Patent Cooperation Treaty, International Search Report and Written Opinion of the International Searching Authority, International Patent Application No. PCT/GB2013/052051, dated Nov. 6, 2013, 11 Pages.

Pincemin, Erwan, et al., "Challenges of 40/100 Gbps and higher-rate deployments over long-haul transport networks," Optical Fiber Technology, vol. 17, pp. 335-362, Aug. 2011.

Shiraishi, T., et al., "Compact LiNbO$_3$ Optical Modulator for Polarization-division-multiplexing RZ-DQPSK," ECOC, Sep. 20-24, 2009, Vienna, Austria, pp. 1-2, XP040470028.

Office Action for Japanese Patent Application No. JP 2015-53857, dated Mar. 13, 2017, 9 Pages.

* cited by examiner

OPTICAL MODULATOR

RELATED APPLICATIONS

This application is a 35 U.S.C. 371 national stage filing of International Application No. PCT/GB2013/052051, filed on Jul. 31, 2013, which claims priority to United Kingdom Patent Application No. 1219116.9, filed on Oct. 24, 2012. The contents of the aforementioned applications are hereby incorporated by reference.

TECHNICAL FIELD

The invention relates to optical modulators. More specifically, the invention relates to folded Mach-Zehnder modulators. The invention further relates to methods and apparatuses that may be implemented in optical modulators.

BACKGROUND

In this specification the term "light" will be used in the sense that it is used in optical systems to mean not just visible light, but also electromagnetic radiation having a wavelength outside that of the visible range.

Optical modulator and polarisation multiplexing devices are complex and typically have large form factors on lithium niobate ($LiNbO_3$) substrates. Further, additional devices, such as variable optical attenuators (VOA) and photodetectors (PD), are often required to be included. The addition of such devices increases considerably the complexity and length of the overall multiplexor chip.

An increased chip length can be of significant importance in chip design because of limitations on maximum chip length due to a given wafer size—chip length must not exceed a given value in order to have a reasonable number of chips on each wafer. Moreover, the length of a package (which includes the modulator or multiplexor chip) is a significant parameter for placing the device inside a transponder or on a line card. Therefore, it is desirable to have a reduced optical modulator chip size.

It is possible to implement an optical modulator using discrete components. However, the package size is then considerably increased due to the required interconnections between the different components.

SUMMARY

According to an aspect of the invention there is provided a folded Mach-Zehnder modulator. The modulator may comprise a beam splitter configured to split an input light beam into a plurality of light beams. The modulator may comprise a plurality of Mach-Zehnder devices configured to receive one or more of the plurality of light beams. The modulator may comprise a U-turn section configured to receive light beams from the Mach-Zehnder devices and to change the direction of the light beams by substantially 180 degrees. The modulator may comprise a polarisation management section configured to combine light beams received from the U-turn section and to output a polarisation multiplexed phase modulated light beam.

Optionally, the beam splitter and the polarisation management section form part of a first discrete passive element of the modulator.

Optionally, the U-turn section forms part of a second discrete passive element of the modulator.

Optionally, the Mach-Zehnder devices form part of a discrete driven element of the modulator.

Optionally, the beam splitter forms part of a first discrete passive element, the U-turn section forms part of a second discrete passive element and the polarisation management section forms part of a third discrete passive element.

Optionally, adjacent discrete elements abut such that there are no free space optics.

Optionally, the polarisation management section comprises a polarisation combiner configured to combine a plurality of light beams into a polarisation multiplexed light beam.

Optionally, the polarisation management section further comprises a polarisation rotator configured such that one or more of the light beams received from the U-turn section passes through the polarisation rotator before passing through the polarisation combiner.

Optionally, the second discrete passive element is fabricated using PLC, and wherein the U-turn section is configured to bend the light beams in a curved path when changing their direction.

Optionally, the curved path of the light beams defines an outer path and one or more inner paths having a reduced radius compared to the outer path, and wherein the inner paths are configured to have a path length to compensate for the reduced radius.

Optionally, the second discrete passive element is fabricated using $LiNbO_3$, and wherein the U-turn section comprises at least two mirrors configured to reflect the light beams when changing their direction.

Optionally, the mirrors are etched on a $LiNbO_3$ substrate and coated with a reflective material.

Optionally, the modulator further comprises at least one variable optical attenuator configured such that one or more light beams from the U-turn section pass through the variable optical attenuator before passing to the polarisation management section.

Optionally, the at least one variable optical attenuator forms part of the discrete driven element.

Optionally, the discrete driven element further comprises a first photodetector device associated with one of the variable optical attenuators, and configured such that one or more light beams from the U-turn section pass through the first photodetector before passing to the associated variable optical attenuator.

Optionally, the discrete driven element further comprises a second photodetector device associated with one of the variable optical attenuators, and configured such that one or more light beams from the associated variable optical attenuator pass through the second photodetector before passing to the polarisation management section.

Optionally, the variable optical attenuator is polarisation independent.

Optionally, the modulator defines a first optical path from an input of the modulator to the U-turn section and a second optical path from the U-turn section to an output of the modulator, and configured such that the first and second optical paths are side-by-side.

Optionally, the modulator defines a first optical path from an input of the modulator to the U-turn section and a second optical path from the U-turn section to an output of the modulator, and configured such that the first and second optical paths are back-to-back.

According to another aspect of the invention, there is provided a folded Mach-Zehnder phase modulator. The modulator may comprise a plurality of Mach-Zehnder devices. Modulator may comprise a U-turn section configured to receive light beams from the Mach-Zehnder devices and to change the direction of the light beams by 180 degrees. modulator may further comprise at least one variable optical attenuator configured to receive the light beams from the U-turn section and to optically attenuate the light beams for output from the modulator.

Optionally, the variable optical attenuator is polarisation independent.

According to another aspect of the invention, there is provided a light beam direction changer. The light beam direction changer may be configured to receive light beams from one or more optical waveguides and/or diffused waveguides. The light beam direction changer may be located on a substrate fabricated using LiNbO$_3$. The light beam direction changer may comprise a mirror configured to reflect the received light beams such that the direction of the light beams is changed.

Optionally, the direction of the light beams is changed by substantially 90 degrees.

Optionally, the light beam direction changer comprises two mirrors arranged such that the total change of direction of the light beams is substantially 180 degrees.

According to another aspect of the invention, there is provided a Mach-Zehnder modulator comprising a discrete driven element fabricated using an electro-optic material. The discrete driven element may comprise a variable optical attenuator configured to attenuate a modulated light beam for output from the modulator. The discrete driven element may comprise a first photodetctor configured to monitor the strength of the modulated light beam before it is passed to the variable optical attenuator. The discrete driven element may comprise a second photodetector configured to monitor the strength of the modulated light beam after it has passed through the variable optical attenuator.

BRIEF DESCRIPTION OF THE FIGURES

Exemplary embodiments of the invention are described herein with reference to the accompanying drawings, in which.

DESCRIPTION

The inventors have appreciated that folded Mach-Zehnder modulator designs reduce the overall package size for a Mach-Zehnder modulator. Further, the folded design increases integration efficiency. Therefore, generally disclosed herein is a folded polarisation multiplexor modulator device.

The folded design disclosed herein is useful for integrating complex electro-optic devices. When multiple functions or devices, for example, a polarization multiplexing modulator with VOA, are required, the folded design allows such integration while keeping the overall device length practically unchanged, with respect to a conventional layout not including the additional devices.

The apparatuses disclosed herein provide the advantage of reduction of at least a factor of two in the required chip area for the device. Further, the apparatuses disclosed herein allow the removal of a double-sided fibre boot from the package by placing fibres on the same side.

Figure 1:
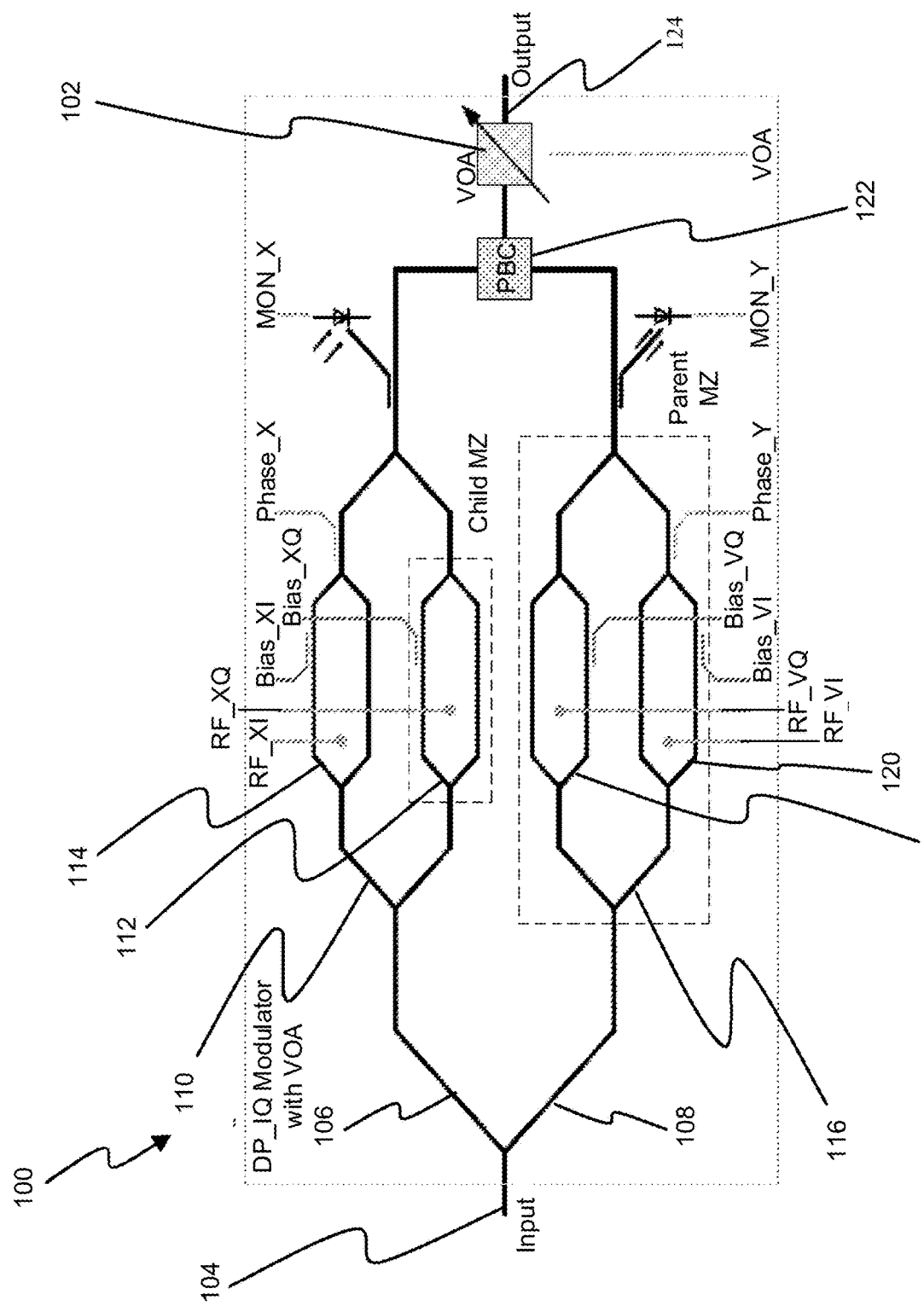
FIG. 1 is a schematic representation of a layout of a Mach-Zehnder modulator.

FIG. 1 shows a layout of a differential phase quadrature phase shift keying modulator with an integrated variable optical attenuator device (DP-QPSK-VOA) 100. The layout shows a number of Mach-Zehnder interferometers (MZI) and a VOA 102.

An input 104 is split into two branches 106, 108. Each branch 106, 108 leads to a parent MZI and two child MZIs. Generally speaking, the child MZIs are nested within a parent MZI. The parent MZIs provide phase modulation for the transverse electric (TE) and transverse magnetic (TM) polarised signals, which are denoted X and Y respectively. The child MZIs provide phase modulation for the in-phase and quadrature components of the TE and TM polarised signals, which are denoted I and Q respectively.

The input branch 106 provides an input to the parent MZI 110. Each branch of the parent MZI 110 provides an input to the child MZIs 112, 114. This arrangement is mirrored on the opposite side of the device, in which parent MZI 116 and child MZIs 118, 120 are fed by input branch 108.

The signals that are output from the parent and child are each input to a polarisation beam combiner (PBC) 122 where the output beams are combined. The combined beams then pass through the VOA 102 before being passed to the output 124.

The parent and child MZIs 110, 112, 114, 116, 118, 120 are controlled by the application of a bias voltage to electrodes (shown schematically in FIG. 1) such that the refractive index of one branch of the MZI is altered. As such, the MZIs may be termed as "driven". This in turn causes a change in the phase of the optical signal output from the MZI.

Figure 2:
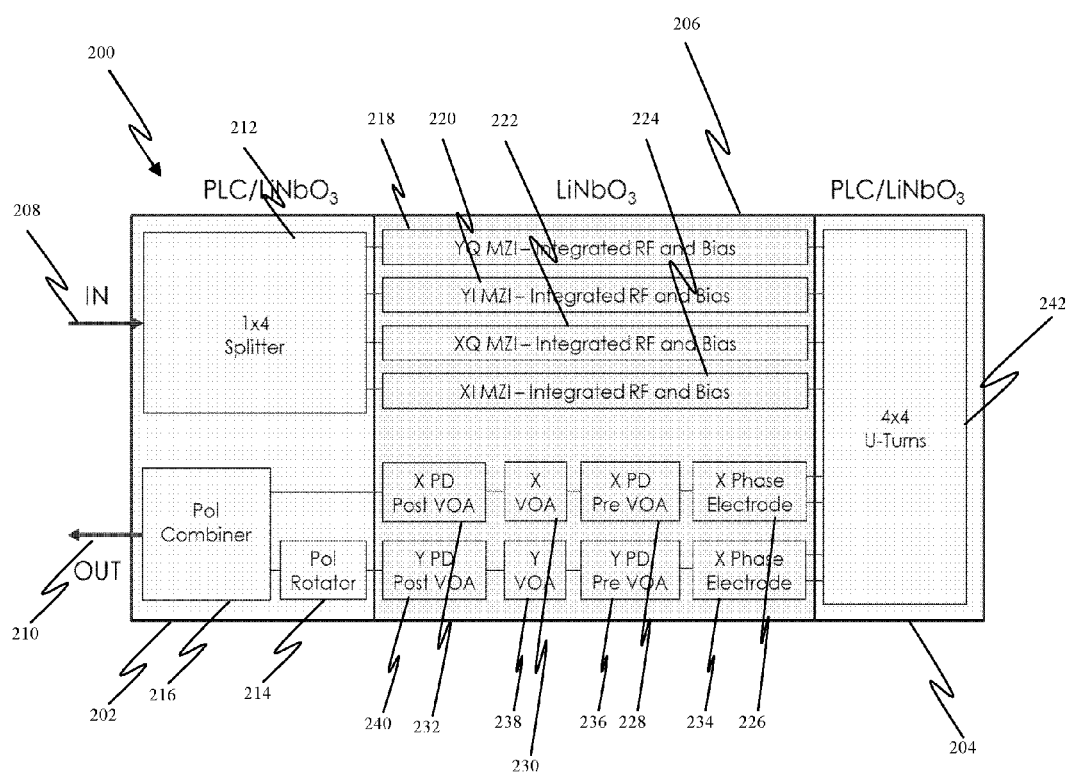
FIG. 2 is schematic representation of a folded Mach-Zehnder modulator.

FIG. 2 is a schematic representation of a DP-QPSK-VOA device 200. The device 200 incorporates a folded design embodied in three discrete elements. The device comprises two discrete passive elements 202, 204 and discrete driven element 206. The term "discrete driven element" encompasses an element of an electro-optic device that comprises components, such as MZIs, that are driven by a voltage. In exemplary devices, the passive elements 202, 204 may comprise splitters, combiners, U-turns, polarisation multiplexing devices and may be fabricated as PLCs or using LiNbO$_3$. The passive elements 202, 204 may also be fabricated using other passive waveguide technologies from materials such as polymers or indium phosphide. The driven element comprises electro-optically driven building blocks, such as MZIs and VOAs and may be fabricated using LiNbO$_3$. The LiNbO$_3$ may be Z-cut or X-cut depending on the required device operating characteristics.

In the example shown in FIG. 2, a first passive element 202 comprises an input 208, an output 210, a beam splitter 212 configured to split an input beam into four, and a polarisation management section comprising a polarisation rotator 214 configured to rotate the polarisation of a beam and a polarisation combiner 216 configured to combine two linearly polarised beams.

The driven element 206 comprises four MZIs 218, 220, 222, 224, which in this example effectively correspond to the child MZIs 112, 114, 118, 120 of FIG. 1. The driven element 206 also comprises X and Y optical paths. The X optical path comprises an X phase electrode 226, an X PD pre VOA 228, and X VOA 230 and an X PD post VOA 232. Similarly, the Y optical path comprises a Y phase electrode 234, a Y PD pre VOA 236, a Y VOA 238 and a Y PD post VOA 240. As in FIG. 1, the four parallel MZIs are denoted XI, XQ, YI and YQ, where I and Q denote the in-phase and in-quadrature components of the QPSK modulator, and X and Y are the TE and TM polarizations to be multiplexed on the transmission channel (e.g. optical fiber). PD devices are integrated on the same chip in order to monitor the power output of the VOA and to provide feedback to a bias control loop (not shown) of the DP-QPSK modulators.

A second passive element 204 comprises a U-turn section 242.

In other exemplary devices, the beam splitter and the polarisation management section may form separate discrete passive elements of the device. Further, the plurality of MZIs and the X and Y optical paths (and associated components) may form separate discrete driven elements of the device. Further still, the beam splitter and the MZIs may form a discrete element of the device, and the X and Y optical paths (and associated components) and the polarisation management section may form another discrete element of the device. In specific exemplary devices, the discrete elements abut such that there are no free space optics.

A light beam is input to the first passive element 202 and travels from the input 208 to the splitter 212, which splits the beam into four separate beams. The four beams exit the first passive element 202 and enter the driven element 206. Each of the four beams passes through an MZI 218, 220, 222, 224, where the phase of the optical signal may be altered. The beams exit the driven element 206 and enter the second passive element 204 into the U-turn section 242. The U-turn section 242 alters the directions of the four beams by approximately 180 degrees. The four beams then exit the second passive element 204 and re-enter the driven element 206. The two X beams enter the X optical path and pass through the corresponding components as set out above. The two Y beams enter the Y optical path and pass through the corresponding components as set out above. The two X beams are combined to a single X beam after the X electrode and the two Y beams are combined to a single Y beam after the Y electrode. The combined X beam exits the active module 206 and re-enters the first passive element 202 into the polarisation combiner 216. The combined Y beam exits the driven element 206 and re-enters the first passive element 202 passing through the polarisation rotator 214 and the polarisation combiner 216. The beams are combined in the polarisation combiner 216 to form a single beam at the output 210.

The PDs 228, 232, 236, 240 positioned before and after the VOAs 230, 238 may be integrated either utilising vertical evanescent coupling or utilising optical spillers. The PDs monitor the strength of the light beams as they enter the VOAs and as they exit the VOAs. The VOAs 230, 238 may be fabricated either with Y-branches or with other optical devices (e.g., Mach-Zehnder interferometers).

Figure 3:
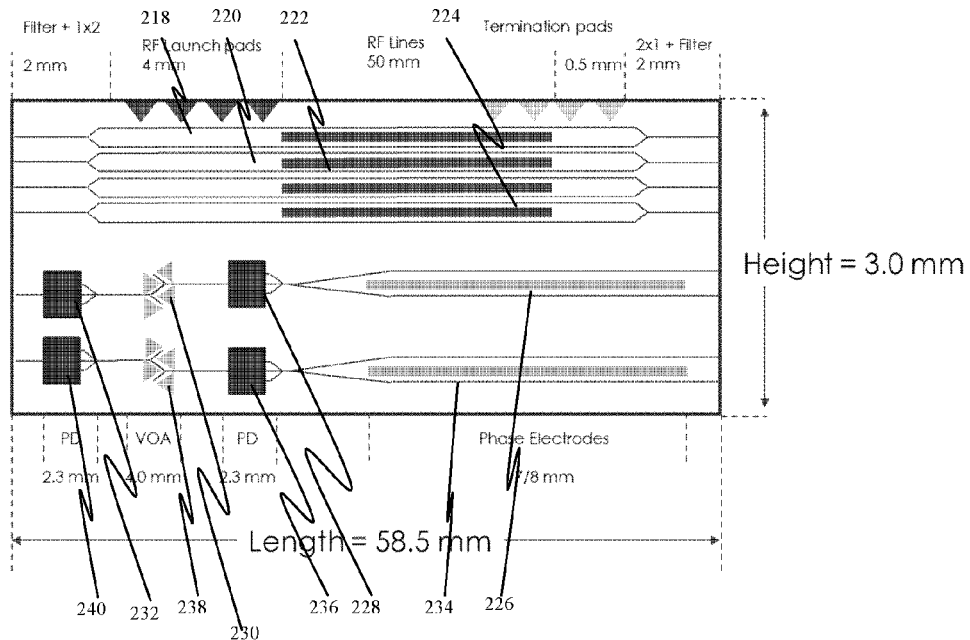
FIG. 3 is a schematic representation of a discrete driven element of a Mach-Zehnder modulator.

FIG. 3 shows a schematic representation of an exemplary driven element, fabricated on LiNbO3, in greater detail with electrical connections. The dimensions shown in FIG. 3 have been determined such that the module fits into a suitable package for a conventional line card and transponder working at 100 Gbps. Other exemplary elements may have other dimensions.

The features of FIG. 3 correspond to those of the driven element 206 of FIG. 2 and are therefore given the same reference numerals.

It is possible to increase the integration density by adding further parallel Mach-Zehnder devices to operate in multi-carrier mode (e.g., with beams having different wavelengths), or with higher-order modulation formats such as 16-QAM and 64-QAM. The integration density roughly corresponds to the number of parallel Mach-Zehnder modulators that are present in a device to allow higher order modulation formats.

Figure 4:
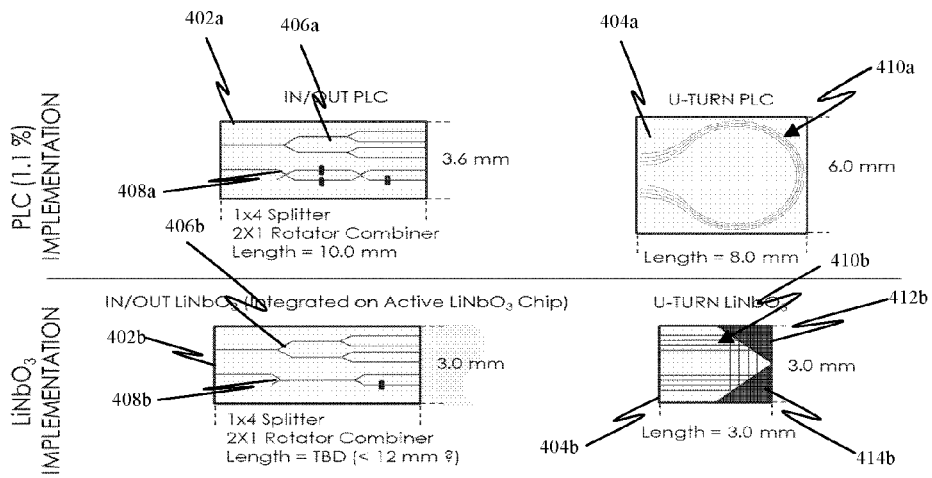
FIG. 4 shows schematic representations of first and second discrete passive elements of a Mach-Zehnder modulator.

FIG. 4 shows exemplary implementations of a first passive element 402a, 402b and a second passive element 404a, 404b comprising a U-turn section. The second passive element 404a, 404b is preferably as small as possible and introduces a minimum perturbation to optical signals passing through it. Specifically, the second passive element 404a, 404b preferably introduces minimum or low insertion loss, little or no polarization conversion and, ideally, no differential delays in the various DP-QPSK signals.

In a first exemplary implementation shown in FIG. 4, the first passive element 402a and the second passive element 404a are manufactured as PLCs. The first passive element 402a comprises a 1×4 splitter 406a, which splits a single input light beam into four light beams. The first passive element 402a further comprises a 2×1 polarisation rotator combiner 408a. The height of the first passive element 402a may be in the range from 3.2 mm to 4.0 mm and, in a specific exemplary first module 402a, may be 3.6 mm. The length of the first passive element 402a may be in the range from 9 mm to 11 mm and, in a specific exemplary first module 402a, may be 10 mm.

The first exemplary implementation of the second passive element 404a is manufactured as a PLC. Four light beams 410a entering the second passive element 404a from a driven element are turned in a curved path through substantially 180 degrees. The U-turn is realised with a bulb-shaped curve in order to reduce the differential optical path delays of the curved waveguides while keeping the propagation and insertion loss low.

The height of the second passive element 404a may be in the range from 5 mm to 7 mm and, in a specific exemplary second passive element 404a, may be 6 mm. The length of the second passive element 404a may be in the range from 5 mm to 10 mm and, in specific exemplary second passive elements 404a, may be 5 mm or 10 mm.

The dimensions of the first and second passive elements 402a, 404a are based on a PLC index step (or index contrast) value of 1.1%. It will be understood that, if different PLC index step values are used, the dimensions of the first and second passive elements 402a, 404a will alter accordingly. The index step may be defined as the percentage difference between the refractive index of a waveguide (e.g. a core) and the refractive index of a surrounding material (e.g. cladding).

Another exemplary first passive element 402b is fabricated using $LiNbO_3$. The first passive element 402b comprises a one to four splitter 406b and a 2×1 polarisation combiner 408b. The height of the first passive element 402b may be in the range from 2.6 mm to 3.4 mm and, in a specific exemplary first element 402b, may be 3 mm. The length of the first passive module 402b may be less than 12 mm and, in specific exemplary first elements 402b, may be in the range from 8 mm to 12 mm.

In the exemplary second passive element 404b, the U-turn element is constructed using corner-mirrors 412b, 414b configured to reflect light inside the waveguides. This allows the light beams 410b to be turned by 90 degrees and can reduce the size of the overall chip by a factor of two or more. The corner mirrors 412b, 414b may be mechanically or chemically etched and then coated with gold to reduce losses. Exemplary corner mirrors 412b, 414b may comprise vertical etched trenches located in an appropriate position with an angle of 45 degrees with respect to the waveguide axis. The etched region(s) may be fabricated, for example, either by deep Reactive Ion-beam Etching (RIE), or by mechanical dicing with appropriate blades. The etched wall may then be covered with evaporated gold to have total reflection with lowest optical loss.

The two passive elements 402a, 404a, 402a, 402b that may be used in exemplary DP-QPSK modulators can be fabricated using different materials and technologies. PLC are available, for instance, using silica-on-glass, indium phosphide, silicon nitride, polymers and other substrates. In each of the exemplary first passive elements 402a, 402b, the implementation of passive splitters and combiners is largely the same. For the polarization combiners there are several options, for example, waveguide rotators and waveplates.

Figure 5:
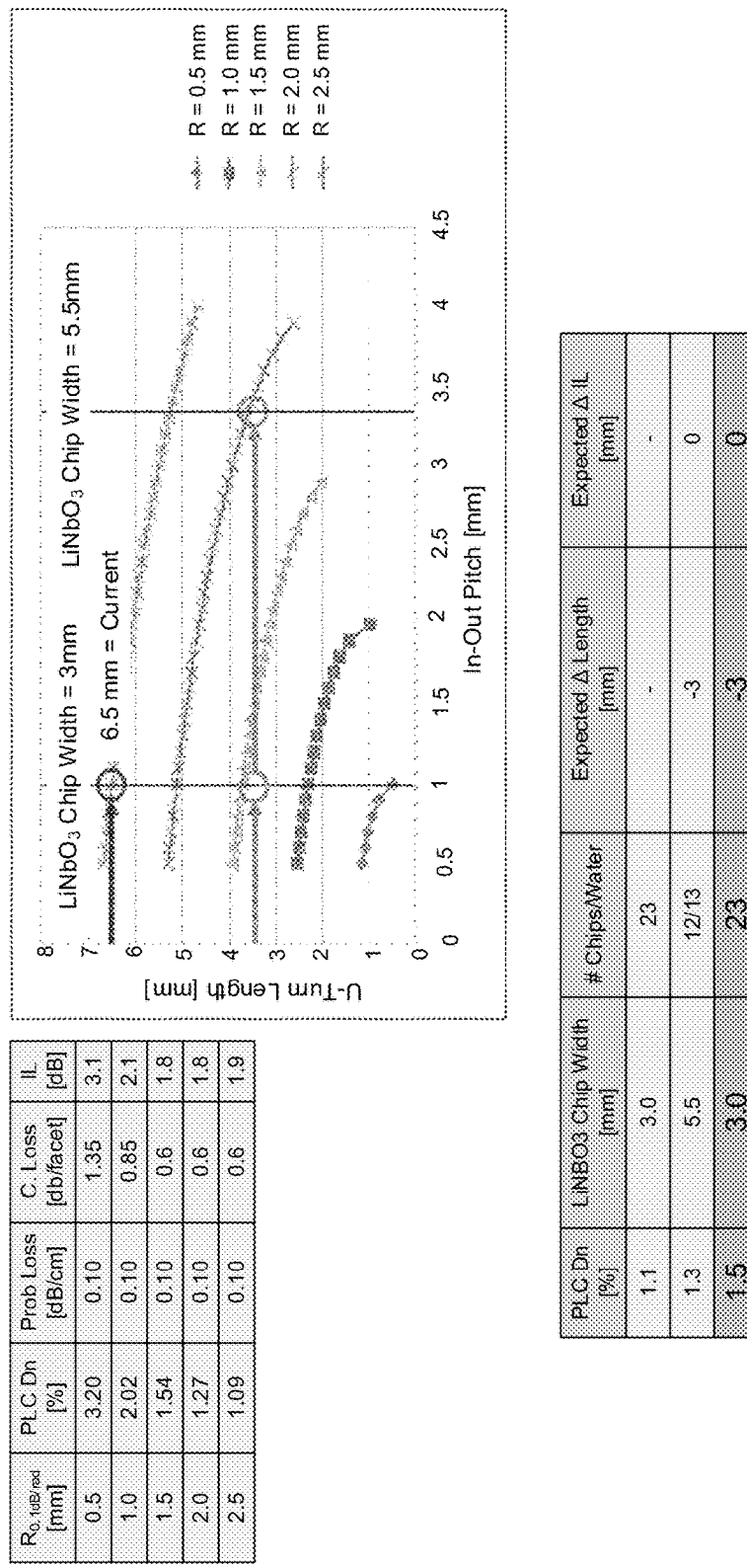
FIG. 5 shows size and total loss information for exemplary U-turn section.

FIG. 5 summarizes the space occupation of second passive elements with different index steps when using standard silica PLC technology. Higher index steps can yield much smaller U-turn devices, but insertion loss grows considerably when these waveguides are connected to LiNbO$_3$ chip (such as the driven element) or standard optical fibres.

Figure 6:
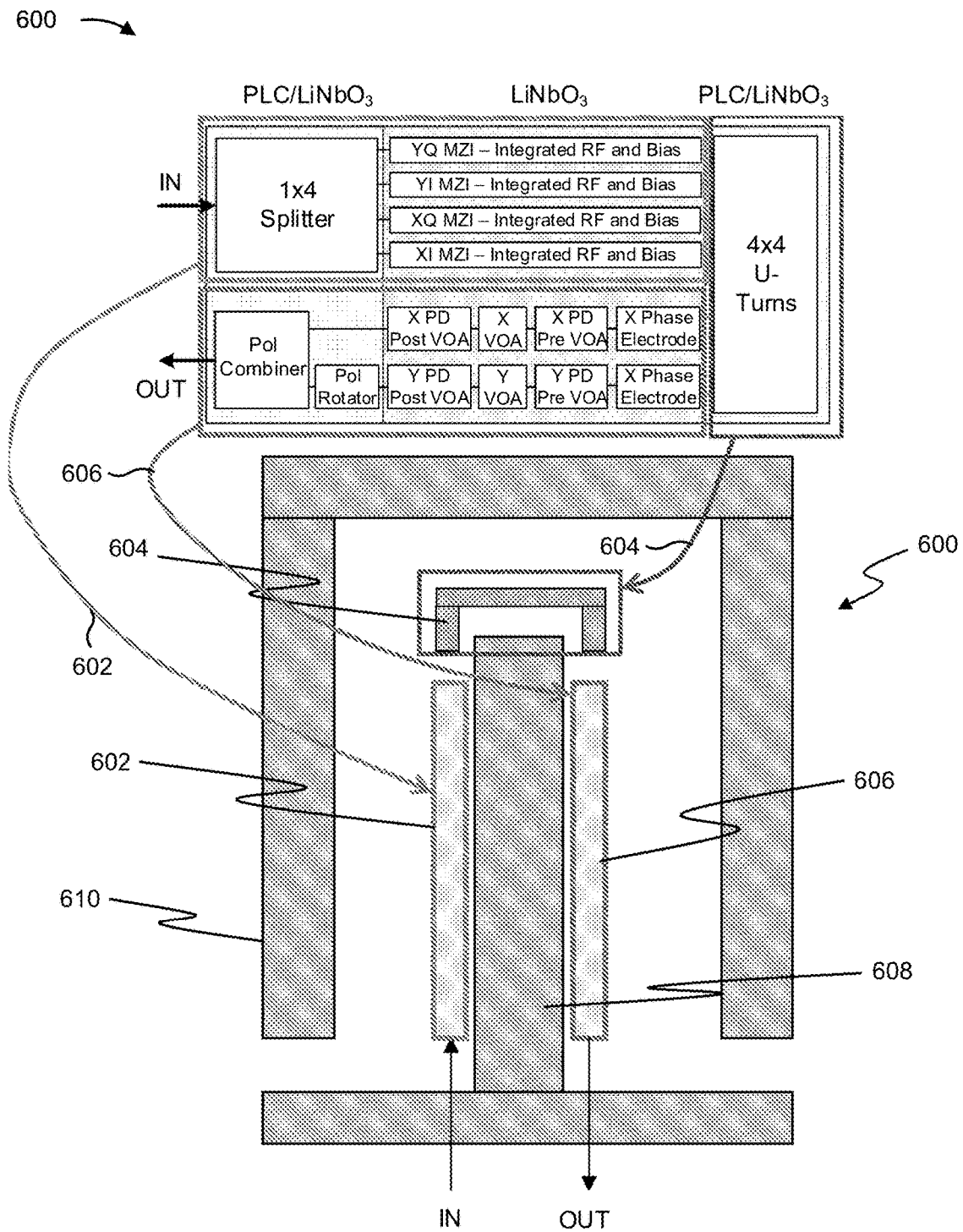
FIG. 6 is schematic representation of a folded Mach-Zehnder modulator.

FIG. 6 shows a section through an alternative implementation of a folded Mach-Zehnder modulator device 600. The implementation of the device 200 of FIG. 2 is shown above the device 600 and the arrows show how the sections of the device 200 correspond to the sections of the device 600. The sections of the device 600 comprise the components shown in the corresponding sections of the device 200.

The device 600 comprises three discrete elements 602, 604, 606. A first discrete element comprises a beam splitter (corresponding to the beam splitter 212) and a plurality of MZIs (corresponding to MZIs 218, 220, 222, 224). The first discrete element 602 may be manufactured using LiNbO$_3$, PLC or a combination of LiNbO$_3$ subassemblies. A second discrete element 604 comprises a U-turn section (corresponding to the U-turn section 242). The second discrete element 604 may be manufactured using LiNbO$_3$ or PLC. A third discrete element 606 comprises X and Y optical paths and associated components (corresponding to the X and Y paths and components of the driven element 206) a polarisation rotator (corresponding to polarisation rotator 214) and a polarisation combiner (corresponding to polarisation combiner 216). The third discrete element 606 may be manufactured using LiNbO$_3$, PLC or a combination of LiNbO$_3$ subassemblies.

The discrete elements 602, 604, 606 are arranged on a support 608 such that they are optical aligned to allow light entering the first discrete element 602 to pass through the second discrete element 604 and exit through the third discrete element 606. The support 608 is generally t-shaped. The device 600 may be contained within a package by the addition of a top hat 610. In exemplary devices, the second discrete element 604 may be generally U-shaped, as shown in FIG. 6, or may be rectangular, which provides more mechanical stability and robustness.

Generally, the device 600 can be seen to have the first and second discrete elements 602, 604 placed back-to-back with the support 608 in between. In contrast, the device 200 has corresponding components placed side-by-side.

A skilled person will envisage further exemplary methods and apparatuses without departing from the scope of the appended claims.

The invention claimed is:

1. A folded Mach-Zehnder modulator, comprising:
a first discrete substrate having a beam splitter configured to split an input light beam into a plurality of light beams;
a second discrete substrate adjacent to and abutting the first substrate, the second substrate having a plurality of Mach-Zehnder devices downstream of the beam splitter configured to receive one or more of the plurality of light beams from the beam splitter; and
a third discrete substrate adjacent to and abutting the second substrate, the third substrate having a U-turn device downstream of the plurality of Mach-Zehnder devices and configured to receive light beams from the plurality of Mach-Zehnder devices and to change the direction of the light beams by substantially 180 degrees;
wherein the second discrete substrate further has at least one variable optical attenuator downstream of the U-turn device, configured to receive the light beams from the U-turn device such that one or more of the light beams pass through the at least one variable optical attenuator;
and wherein the first discrete substrate further has polarisation management devices downstream of at least one variable optical attenuator and configured to combine light beams received from the at least one variable optical attenuator and to output a polarisation multiplexed phase modulated light beam;
and wherein:
a first optical path is defined from an input of the modulator through the beam splitter and the plurality of Mach-Zehnder devices to an input of the U-turn device;
a second optical path is defined from an output of the U-turn device through the at least one variable attenuator and the polarisation management devices to an output of the modulator; and
the first and second optical paths are side-by-side.

2. The folded Mach-Zehnder modulator according to claim 1, wherein the polarisation management devices include a polarisation combiner configured to combine a plurality of light beams into a polarization multiplexed light beam.

3. The folded Mach-Zehnder modulator according to claim 2, wherein the polarisation management devices further include a polarisation rotator configured such that one or more of the light beams received from the U-turn device passes through the polarisation rotator before passing through the polarisation combiner.

4. The folded Mach-Zehnder modulator according to claim 2, wherein the second discrete substrate is fabricated using PLC, and wherein the U-turn device is configured to bend the light beams in a curved path when changing their direction.

5. The folded Mach-Zehnder modulator according to claim 4, wherein the curved path of the light beams defines an outer path and one or more inner paths having a reduced radius compared to the outer path, and wherein the inner paths are configured to have a path length to compensate for the reduced radius.

6. The folded Mach-Zehnder modulator according to claim 2, wherein the second discrete substrate is fabricated using LiNb03, and wherein the U-turn device comprises at least two mirrors configured to reflect the light beams when changing their direction.

7. The folded Mach-Zehnder modulator according to claim 1, wherein the second discrete substrate further comprises a first photodetector device associated with a variable optical attenuator of the at least one variable optical attenuator, and configured such that one or more light beams from the U-turn device pass through the first photodetector before passing to the associated variable optical attenuator.

8. The folded Mach-Zehnder modulator according to claim 7, wherein the second discrete substrate further comprises a second photodetector device associated with a second variable optical attenuator of the at least one variable optical attenuator, and configured such that one or more light beams from the second variable optical attenuator pass through the second photodetector before passing to the polarisation management devices.

9. The folded Mach-Zehnder modulator according to claim 1, wherein the at least one variable optical attenuator is polarization independent.

* * * * *